United States Patent [19]

Takei

[11] Patent Number: 5,292,211
[45] Date of Patent: Mar. 8, 1994

[54] DRIVE APPARATUS AND XY DRIVE APPARATUS ON WHICH IT IS EQUIPPED

[75] Inventor: Seiji Takei, Kanagawa, Japan

[73] Assignee: Nippon Thompson Co., Ltd., Tokyo, Japan

[21] Appl. No.: 21,972

[22] Filed: Feb. 24, 1993

[30] Foreign Application Priority Data

Mar. 27, 1992 [JP] Japan ................................. 4-100329

[51] Int. Cl.⁵ .............................................. B23B 35/00
[52] U.S. Cl. ............................... 408/91; 74/479 PH; 108/137; 248/657; 269/60; 384/9
[58] Field of Search .............. 408/87, 91, 234; 409/163, 164, 197, 159, 219, 235; 248/656, 657; 108/137, 143; 269/60; 74/479 PH; 384/9

[56] References Cited

U.S. PATENT DOCUMENTS

| | | | |
|---|---|---|---|
| 4,372,222 | 2/1983 | Tice | 108/137 |
| 4,561,814 | 12/1985 | Dahlgren, Jr. et al. | 409/137 |

Primary Examiner—Daniel W. Howell
Attorney, Agent, or Firm—Sughrue, Mion, Zinn, Macpeak & Seas

[57] ABSTRACT

A drive apparatus and a XY drive apparatus on which it is equipped that accomplishes highly accurate driving and positioning of a driven object by absorbing deflection of a nut in the radial direction while employing a simple construction.

Deflection of a nut is absorbed by deflection of flexible portions as a result of said nut being supported by an intermediate member having said flexible portions able to deflect in a radial direction perpendicular to the shaft center of a feed screw.

7 Claims, 6 Drawing Sheets

DRIVE APPARATUS AND XY DRIVE APPARATUS ON WHICH IT IS EQUIPPED

BACKGROUND OF THE INVENTION

1. Field of the Invention

The present invention relates to a drive apparatus for moving a certain object (driven object) in a desired direction, and an XY drive apparatus on which said drive apparatus is equipped.

2. Description of the Prior Art

An example of the prior art having this type of drive apparatus is the XY drive apparatus indicated in FIG. 1.

As indicated in FIG. 1, said XY drive apparatus is composed of X table 1 installed on the floor or a mounting frame in a workshop, and Y table 2, that is supported and moved by said X table 1 and arranged to be intersecting with said X table 1. Furthermore, since X table 1 and Y table 2 mutually have nearly the same constitution, the following detailed explanation will be provided with respect to X table 1 only, and an explanation of Y table 2 is omitted. However, those constituent members of Y table 2 that correspond to the constituent members of X table 1 are indicated using the same reference numerals.

As indicated in FIGS. 1 and 2, X table 1 has a long, roughly rectangular plate-shaped base 13, and side plate 14 is provided on both sides of said base 13. Mounting member 15 is attached to one end of base 13, and motor 16 and sensor connector 17 are mounted on said mounting member 15. In addition, stationary bearing mechanism 18 is provided on the other end of base 13, and ball screw 19 is supported by said stationary bearing mechanism 18. In addition, the torque of motor 16 is transmitted to ball screw 19 through coupling 20. Furthermore, as is well known, ball screw 19 is composed of a feeding screw in the form of male screw 21, and a female screw in the form of nut 22 that screws onto male screw 21 by means of a ball (not shown), and moves as a result of rotation of said male screw 21.

As indicated in FIG. 2, one end of male screw 21 is supported by bearing 18a equipped on stationary bearing mechanism 18 while allowing to rotate freely. The other end 21a is formed to be narrower than the threaded portion, and is supported by bearing 23a equipped on bearing unit 23 while allowing to rotate freely. In addition, the gap in the axial direction between this other end 21a and bearing 23a is eliminated by tightening of bearing nut 24 resulting in regulation of movement in the axial direction by male screw 21, and the torque of motor 16 is transmitted as a result of being linked to coupling 20.

On the other hand, nut 22 is fastened by bolts (not provided with reference numerals) to the end of moving table 27 having a roughly T-shaped cross-section as indicated in FIG. 3. This moving table 27 is formed of a size that allows it to be contained within the width of side plate 14, and two table projections 27a are formed in parallel on the upper surfaces of both its left and right sides, that protrude above the upper surface of side plate 14. Above-mentioned Y table 2 is attached to these table projections 27a with bolts (not shown). Furthermore, as indicated in FIGS. 1 and 3, cover 28, acting to prevent entrance of dust and debris, is arranged to be positioned to the inside of both of these table projections 27a. In addition, as indicated in FIG. 3, stopper 29, having a prescribed length, protrudes from one end of moving table 27. This stopper 29 is for restricting movement of moving table 27 to the end position in the axial direction of said moving table 27.

As indicated in FIGS. 2 and 3, moving table 27 is supported by a pair of sliding members 31. These sliding members 31 are formed to have a cross-section roughly in the shape of a "U", and slide along guide rails 32 mounted on mounting surfaces 13a of base 13. A guiding device that guides moving table 27 in the direction in which is to drive (X) by these sliding members 31 and guide rails 32. Furthermore, two grooves 13b are formed in parallel with the above-mentioned mounting surfaces 13a on base 13, and sensors 34, for detecting the stroke limit and origin position of moving table 27, are mounted at the prescribed locations of said grooves 13b.

The following provides an explanation of the operation of the XY drive apparatus composed of the above-mentioned constitution.

Firstly, electrical power is supplied to each motor 16 of X table 1 and Y table 2.

When an electrical power voltage is applied to motor 16 of X table 1, said motor 16 turns resulting in torque being transmitted to male screw 21 of ball screw 19 through coupling 20 and so forth. As a result of this rotation of male screw 21, moving table 27 mounted to nut 22 moves linearly in the X direction along guide rails 32. Accordingly, Y table 2 mounted on said moving table 27 also moves in the X direction.

On the other hand, since Y table 2 is composed in the same manner as the above-mentioned X table 1 so moving table 27 (see FIG. 1) equipped on it linearly moves independently in the Y direction, by controlling the operation of said X table 1 and Y table 2 by a control circuit not shown, workpieces in the form of electronic components placed on moving table 27 of Y table 2 can be moved two-dimensionally as desired.

As described above, in the drive apparatus of the prior art, a driven object in the form of moving table 27 is driven by ball screw 19. However, the generation of deflection within those surfaces of nut 22 perpendicular to the shaft center of male screw 21, or in other words, in the radial direction, accompanying rotation of said male screw 21, cannot be avoided in ball screw 19. Thus, the electronic components and so forth on moving table 27 are subjected to pitching and yoking resulting from this deflection of nut 22, thus resulting in the shortcoming of having a detrimental effect on straightness and other factors related to accuracy of positioning or orientation of said electronic components and so forth.

SUMMARY OF THE INVENTION

In consideration of the above-mentioned shortcomings of the prior art, the object of the present invention is to provide a drive apparatus and an XY drive apparatus on which it is equipped that accomplishes highly accurate driving and positioning of a driven object by absorbing deflection of a nut in the radial direction while employing a simple construction.

The present invention comprises a drive apparatus containing: a feed screw; and, a nut that screws onto the above-mentioned feed screw and is coupled to a driven object; wherein, an intermediate member is provided that is attached to said driven object and supports the above-mentioned nut so as to allow movement of said nut within a plane roughly perpendicular to the shaft center of the above-mentioned feed screw, and the above-mentioned intermediate member is composed of a base portion that is mounted on the above-mentioned drive object, a moving portion that is attached to the above-mentioned nut, and flexible portions able to be deflected that integrate the above-mentioned base portion and the above-mentioned moving portion within the above-mentioned plane.

In addition, the present invention also comprises an XY drive apparatus having a pair of tables arranged to be mutually intersecting and able to move by one of the tables supporting the other, with each of the above-mentioned tables containing a feed screw and a nut that screws onto the above-mentioned feed screw and is coupled to a driven object; wherein, an intermediate member is provided that is attached to said driven object and supports the above-mentioned nut so as to allow movement of said nut within a plane roughly perpendicular to the shaft center of the above-mentioned feed screw, and the above-mentioned intermediate member is composed of a base portion that is mounted on the above-mentioned drive object, a moving portion that is attached to the above-mentioned nut, and flexible portions able to be deflected that integrate the above-mentioned base portion and the above-mentioned moving portion within the above-mentioned plane.

DESCRIPTION OF THE PREFERRED EMBODIMENTS

Figure 1:
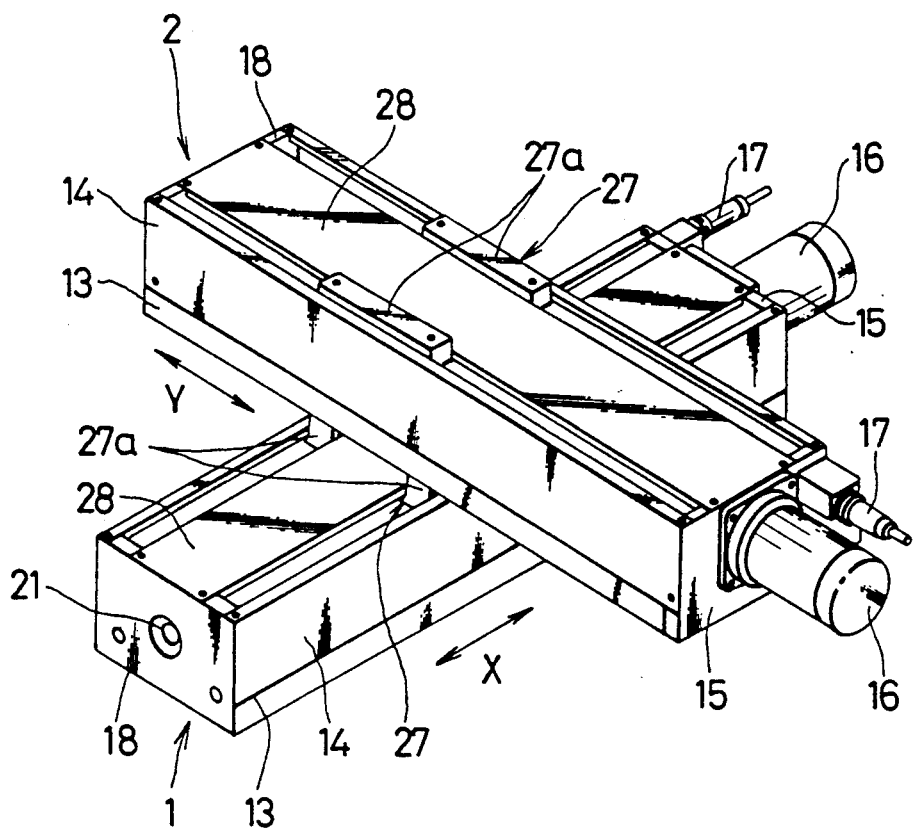
FIG. 1 is a perspective view of an XY drive apparatus of the prior art.
Figure 2:
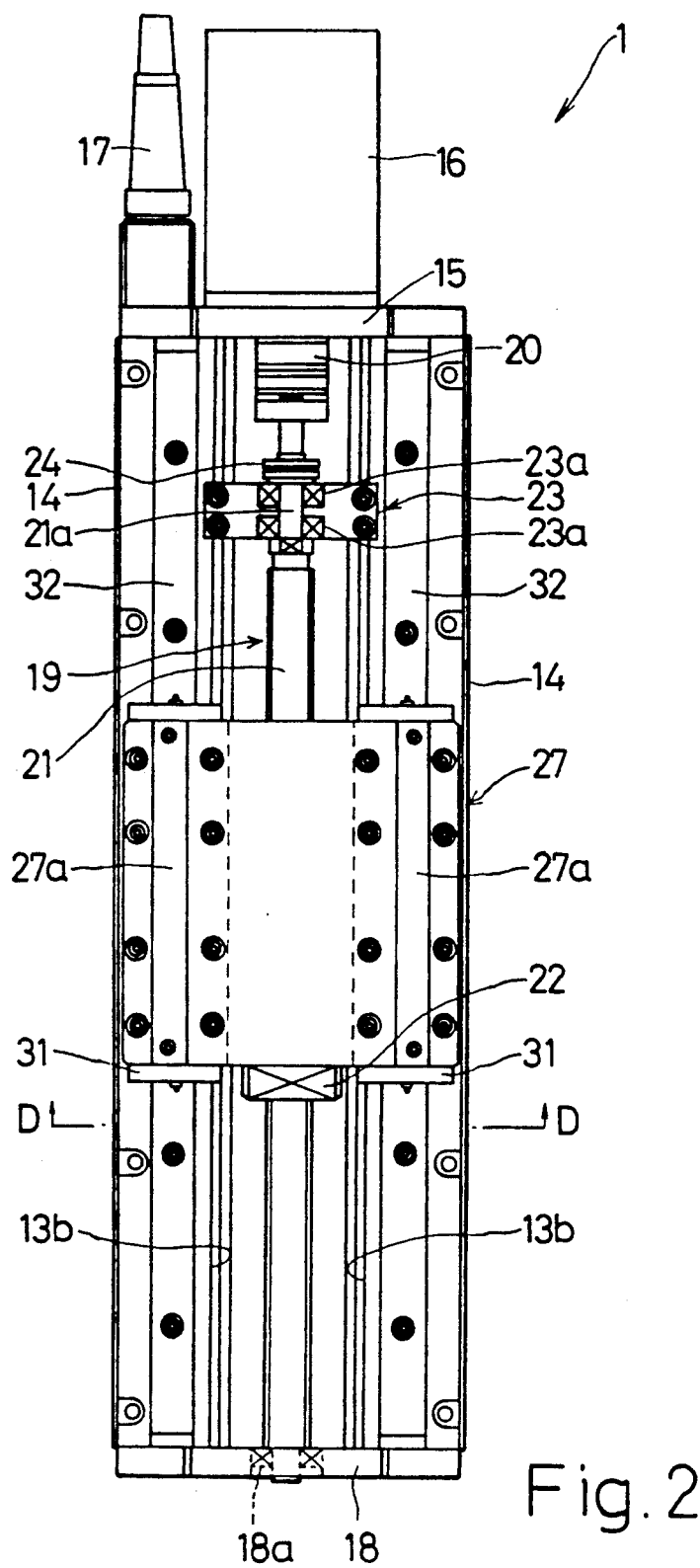
FIG. 2 is an overhead view of the internal mechanism of an X table equipped on the XY drive apparatus indicated in FIG. 1.
Figure 3:
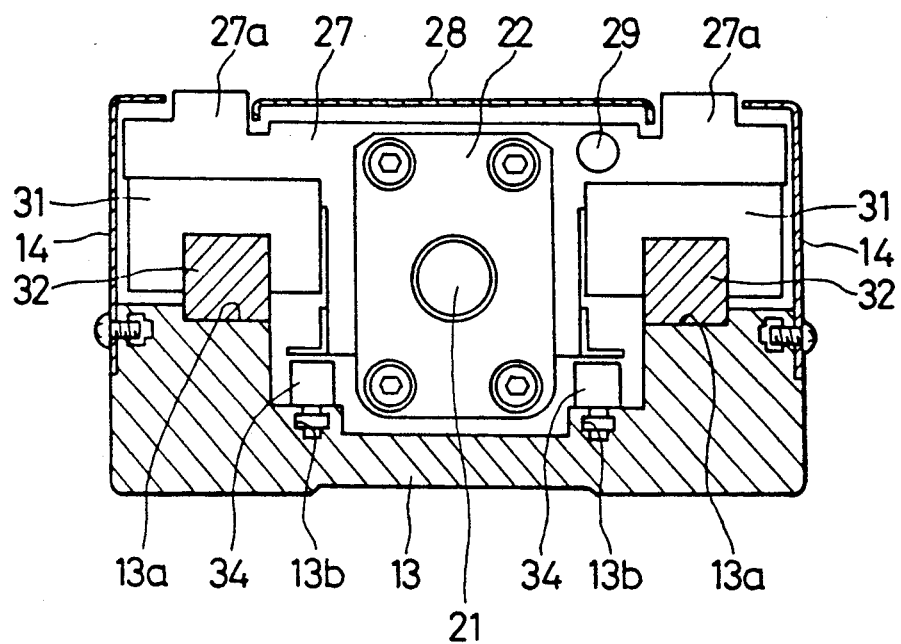
FIG. 3 is a cross-sectional view taken along line D—D relating to FIG. 2.

The following provides an explanation of the XY drive apparatus pertaining to the present invention with reference to the attached drawings. Furthermore, since this XY drive apparatus is composed in the same manner as the XY drive apparatus of the prior art indicated in FIGS. 1 through 3 with the exception of the essential components explained below, an explanation of the overall apparatus will be omitted. In addition, in the explanation provided below, those constituent members that are either identical or correspond to the constituent members of said XY drive apparatus of the prior art will be provided with the same reference numerals.

Figure 4:
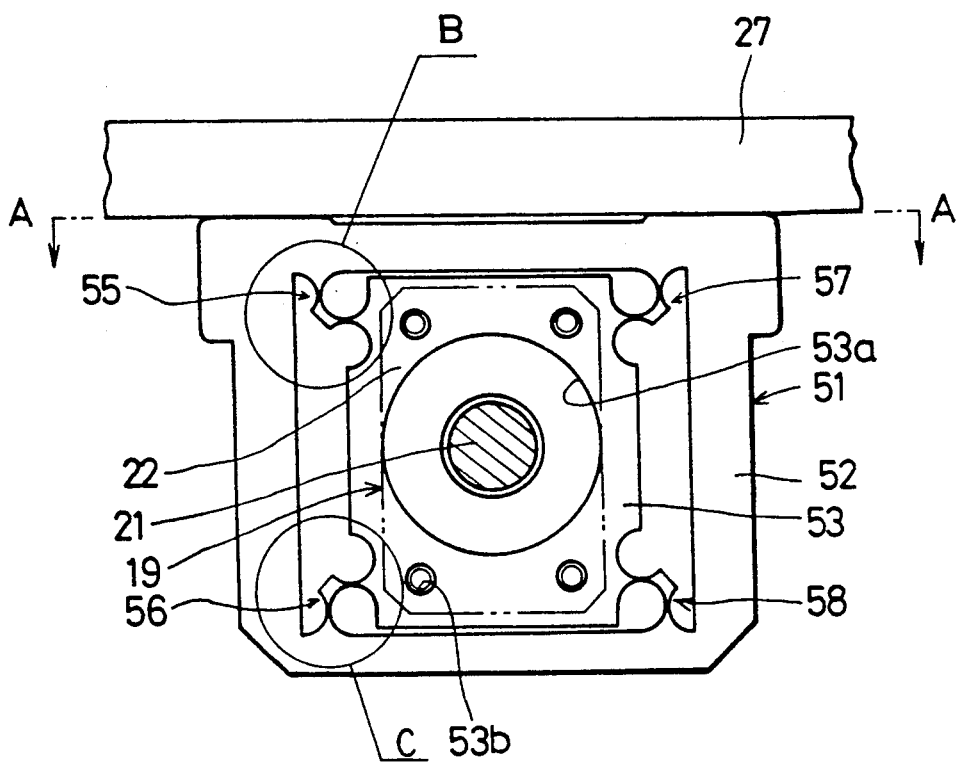
FIG. 4 is a front view, including a partial cross-section, of the essential components of the XY drive apparatus pertaining to the present invention.
Figure 5:
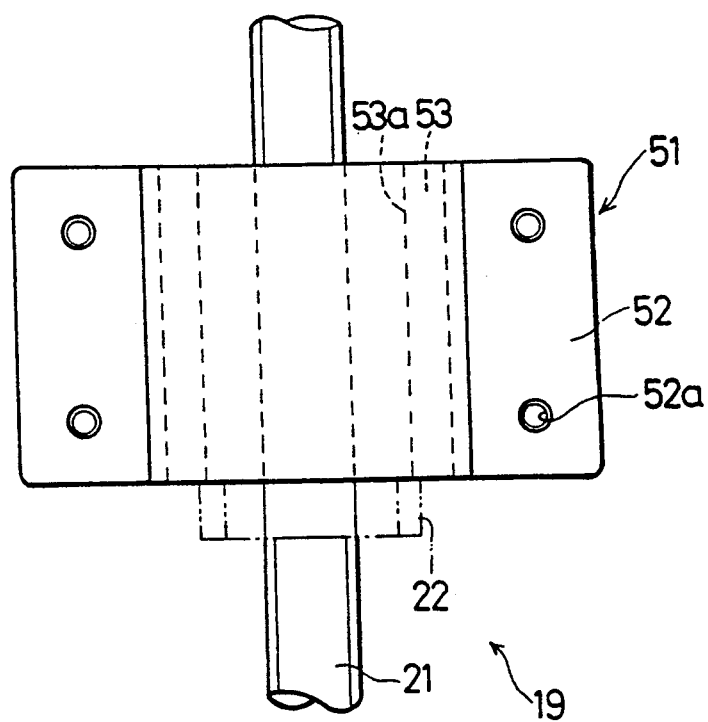
FIG. 5 is a view taken along line A—A relating to FIG. 4.

As indicated in FIGS. 4 and 5, intermediate member 51 is mounted on the bottom surface of a driven object in the form of moving table 27 in the XY drive apparatus pertaining to the present invention. Nut 22, which composes ball screw 19 with male screw 21, is mounted on this intermediate member 51. This intermediate member 51 is formed by performing ordinary cutting processing and wire cutting processing on a block-shaped metal material.

As is clear from FIG. 4, intermediate member 51 is composed of base portion 52, formed symmetrically on the right and left sides, mounted on moving table 27 and formed into a hollow and roughly rectangular parallelepiped shape, roughly rectangular parallelepiped-shaped moving portion 53, having a length roughly the same as said base portion 52, positioned in the floating inserted state within said base portion 52, and having nut 22 mounted on one end, and four flexible portions 55–58, able to be deflected within a plane perpendicular to the shaft center of male screw 21, and integrated into a single unit with said base portion 52 and moving portion 53. As indicated in FIG. 4, moving portion 53 has circular hollow portion 53a, with male screw 21 inserted in the floating state into this hollow portion 53a. Thus, male screw 21 is inserted in the floating state inside moving portion 53, and moreover, this moving portion 53 is inserted in the floating state inside base portion 52. As a result of having this constitution, intermediate member 51 is compact in size. As a result of said constitution, nut 22 is able to move within said plane, or in other words, in the radial direction. Consequently, even if nut 22 is subjected to deflection by the rotation of male screw 21, since only the driving force that acts in the axial direction of said male screw 21 is transmitted to moving table 27, pitching and yoking, etc., are eliminated. Furthermore, as indicated in FIG. 4, for example, 4, holes 53b, into which bolts (not shown) are to be screwed for fastening nut 22, are formed in moving portion 53 of intermediate member 51. In addition, as indicated in FIG. 5, for example, 4, threaded holes 2a, into which bolts (not shown) are screwed for connecting base portion 52 to moving table 27, are also formed in base portion 52 of intermediate member 51.

The following provides a detailed description of each of the above-mentioned flexible portions 55–58.

As is clear from FIG. 4, each of flexible portions 55–58 are positioned corresponding to the four corners of the above-mentioned base portion 52 and moving portion 53. Furthermore, as previously described, since intermediate member 51 has a laterally symmetrical shape, an explanation is only provided for two flexible portions 55 and 56, with explanations of the other two flexible portions 57 and 58 omitted because they have a similar form. In addition, each of these flexible portions 55–58 are formed continuously over roughly the entire length of the above-mentioned base portion 52 and moving portion 53.

Figure 6:
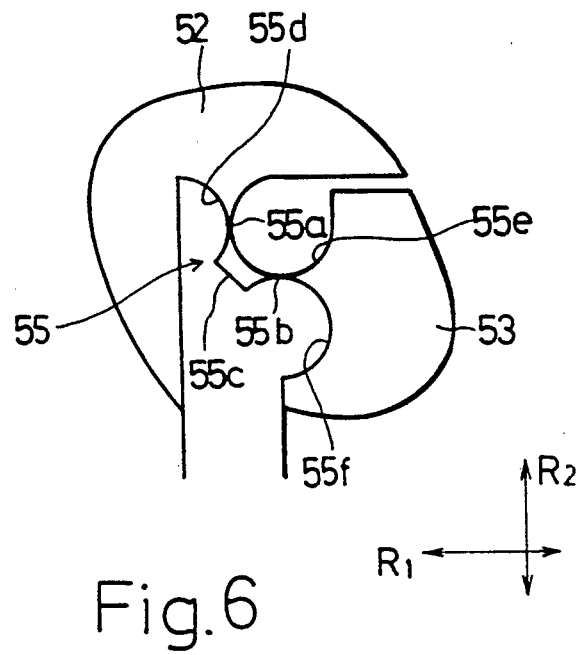
FIG. 6 is an enlarged view of portion B in FIG. 4.

As indicated in FIG. 6, flexible portion 55 is composed of thin-walled first flexible portion 55a and second flexible portion 55b coupled into a single unit to base portion 52 and moving portion 53, respectively, and relay portion 55c in the shape of a small block provided to run between said first and second flexible portions. Furthermore, as is clear from this drawing, first flexible portion 55a and second flexible portion 55b are obtained by forming semi-circular shaped notches 55d–55f in the material of intermediate member 51 in the form of a metal block (described above).

The above-mentioned first flexible portion 55a is flexible in a first prescribed direction R1 within a plane perpendicular to the shaft center of male screw 21, while the other second flexible portion 55b is flexible in a second prescribed direction R2 that is perpendicular to said first prescribed direction R1.

On the other hand, flexible portion 56, which is positioned beneath the above-mentioned flexible portion 55, is composed in the manner described below.

Figure 7:
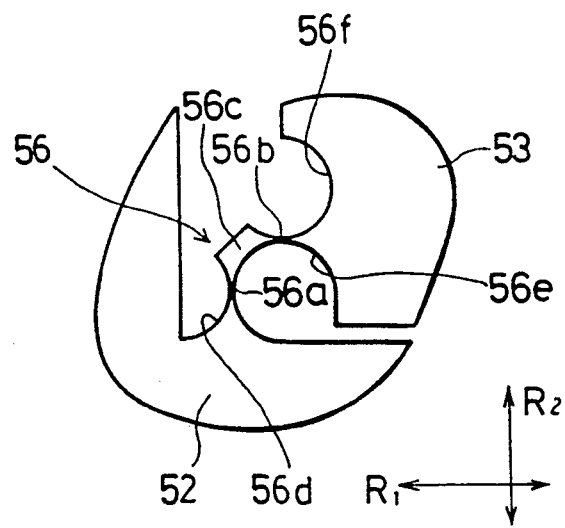
FIG. 7 is an enlarged view of portion C in FIG. 4.

As indicated in FIG. 7, flexible portion 56 is composed of thin-walled first flexible portion 56a and second flexible portion 56b coupled into a single unit to base portion 52 and moving portion 53, respectively, and relay portion 56c in the shape of a small block provided to run between said first and second flexible portions. Furthermore, as is clear from this drawing, first flexible portion 56a and second flexible portion 56b are obtained by forming semi-circular shaped notches 56d-56f in the material of intermediate member 51 in the form of a metal block (described above).

The above-mentioned first flexible portion 56a is flexible in the above-mentioned first prescribed direction R1, while the other second flexible portion 56b is flexible in the above-mentioned second prescribed direction R2.

In the above-mentioned constitution, when male screw 21 is rotated by the torque applied by a motor (16: see FIG. 1), nut 22 moves and moving table 27 is driven by means of intermediate member 51. At this time, even if nut 22 is subjected to the occurrence of deflection in the radial direction by the axial deflection and so forth of male screw 21, this deflection is not transmitted to moving table 27 whatsoever due to four flexible portions 55-58 deflecting freely. However, deflection of nut 22 in the first prescribed direction R1 indicated in FIGS. 6 and 7 is absorbed by deflection of first flexible portions 55a and 56a equipped on flexible portions 55 (57) and 56 (58), while deflection of nut 22 in the second prescribed direction R2 is absorbed by deflection of secondary flexible portions 55b and 56b.

On the other hand, since each of the above-mentioned flexible portions 55-58 are only able to deflect in the radial direction, and are provided with large rigidity in the feeding direction of nut 22, said flexible portions 55-58 are not deformed thus resulting in accurate feeding of nut 22, or in other words, accurate driving and positioning of moving table 27.

Furthermore, although the above-mentioned embodiment composes a drive apparatus using ball screw 19, a feed screw having ordinary threads (not shown) and a nut that screws onto said screw may naturally also be used.

According to the present invention as explained above, since a nut is supported by an intermediate member having flexible portions able to deflect in a radial direction perpendicular to the shaft center of a feed screw, pitching, yoking and so forth of a driven object accompanying nut deflection are eliminated, thus offering the advantage of being able to perform highly accurate driving with excellent straightness and so forth.

In addition, the above-mentioned intermediate member is formed into a single unit that is compact in size, thus offering the advantage of simplifying the construction of the overall drive apparatus.

What is claimed is:

1. A drive apparatus containing: a feed screw; and, a nut that screws onto the above-mentioned feed screw and is coupled to a driven object; wherein, an intermediate member is provided that is attached to said driven object and supports the above-mentioned nut so as to allow movement of said nut within a plane roughly perpendicular to the shaft center of the above-mentioned feed screw, and the above-mentioned intermediate member is composed of a base portion that is mounted on the above-mentioned drive object, a moving portion that is attached to the above-mentioned nut, and flexible portions able to be deflected that integrate the above-mentioned base portion and the above-mentioned moving portion within the above-mentioned plane.

2. The drive apparatus of claim 1 wherein the above-mentioned flexible portion has a first flexible portion able to deflect in a first prescribed direction within the above-mentioned plane, and a second flexible portion formed into a single unit and continuous with the above-mentioned first flexible portion, that is able to deflect in a second prescribed direction roughly perpendicular to the above-mentioned first prescribed direction within the above-mentioned plane.

3. The drive apparatus of claim 1 wherein the above-mentioned base portion and moving portion are both formed to be hollow, the above-mentioned moving portion is inserted in the floating state into the above-mentioned base portion, and the above-mentioned feed screw is inserted in the floating state into the above-mentioned moving portion.

4. The drive apparatus of claim 1 wherein the above-mentioned feed screw and nut are composed of a ball screw.

5. The drive apparatus of claim 1 containing a guiding device that guides the above-mentioned driven object in the direction said driven object is to be driven.

6. An XY drive apparatus having a pair of tables arranged to be mutually intersecting and able to move by one of the tables supporting the other, with each of the above-mentioned tables containing a feed screw and a nut that screws onto the above-mentioned feed screw and is coupled to a driven object; wherein, an intermediate member is provided that is attached to said driven object and supports the above-mentioned nut so as to allow movement of said nut within a plane roughly perpendicular to the shaft center of the above-mentioned feed screw, and the above-mentioned intermediate member is composed of a base portion that is mounted on the above-mentioned driven object, a moving portion that is attached to the above-mentioned nut, and flexible portions able to be deflected that integrate the above-mentioned base portion and the above-mentioned moving portion within the above-mentioned plane.

7. The XY drive apparatus of claim 6 containing a guiding device that guides the above-mentioned driven object in the direction said driven object is to be driven.

* * * * *